United States Patent
Uehara et al.

(10) Patent No.: US 8,401,556 B2
(45) Date of Patent: Mar. 19, 2013

(54) MOBILE TERMINAL AND METHOD USED IN THE SAME

(75) Inventors: Naoki Uehara, Fukuoka (JP); Yukihiko Okumura, Yokohama (JP); Hidetoshi Ebara, Kawasaki (JP)

(73) Assignee: NTT DoCoMo, Inc., Tokyo (JP)

( * ) Notice: Subject to any disclaimer, the term of this patent is extended or adjusted under 35 U.S.C. 154(b) by 289 days.

(21) Appl. No.: 12/463,744

(22) Filed: May 11, 2009

(65) Prior Publication Data

US 2009/0291688 A1 Nov. 26, 2009

(30) Foreign Application Priority Data

May 22, 2008 (JP) ................................ 2008-134601

(51) Int. Cl.
*H04W 36/00* (2009.01)
*H04W 24/00* (2009.01)
*H04W 4/00* (2009.01)
*H04B 7/00* (2006.01)

(52) U.S. Cl. ........ 455/436; 455/441; 455/456; 455/434; 455/515; 455/522

(58) Field of Classification Search .................. 455/436, 455/67.1, 441
See application file for complete search history.

(56) References Cited

U.S. PATENT DOCUMENTS

| | | | |
|---|---|---|---|
| 7,383,022 B2 * | 6/2008 | Sebire et al. | 455/67.11 |
| 2007/0218906 A1 | 9/2007 | Melia et al. | |
| 2010/0298001 A1 * | 11/2010 | Dimou et al. | 455/441 |

FOREIGN PATENT DOCUMENTS

| | | |
|---|---|---|
| CN | 101039236 A | 9/2007 |
| EP | 0 455 614 A1 | 11/1991 |
| EP | 0 532 485 A2 | 3/1993 |
| EP | 0 532 485 A3 | 3/1993 |
| JP | 5-41689 | 2/1993 |
| JP | 2002-10313 | 1/2002 |
| JP | 2004-522326 A | 7/2004 |
| JP | 2006-246428 A | 9/2006 |
| JP | 2007-202096 | 8/2007 |
| JP | 2007-258845 | 10/2007 |
| WO | WO 01/43333 A1 | 6/2001 |
| WO | WO 2007/050228 A2 | 5/2007 |
| WO | WO 2007/050228 A3 | 5/2007 |

OTHER PUBLICATIONS

3GPP TS 25.331 V6.10, 3rd Generation Partnership Project;Technical Specification Group Radio Access Network; Radio Resource Control (RRC); Protocol Specification(Release 6), Mar. 2004, 1034 Pages.

(Continued)

*Primary Examiner* — Christopher M Brandt
*Assistant Examiner* — Muthuswamy Manoharan
(74) *Attorney, Agent, or Firm* — Oblon, Spivak, McClelland, Maier & Neustadt, L.L.P.

(57) ABSTRACT

A mobile terminal used in a cellular mobile communication system is disclosed. The mobile terminal includes a measuring unit configured to measure reception levels of received signals; an averaging unit configured to average the measured reception levels based on a forgetting factor; a cell reselection unit configured to reselect a cell based on the averaged reception level; and a factor determining unit configured to determine the forgetting factor according to parameters sent from a network.

4 Claims, 8 Drawing Sheets

OTHER PUBLICATIONS

Office Action issued May 9, 2011, in China Patent Application No. 200910202801.5 (with English translation).
Office Action issued Sep. 18, 2012 in Japanese Patent Application No. 2008-134601 (with English-language translation).

"Digital cellular telecommunications system (Phase 2+); General Packet Radio Service (GPRS); Overall description of the GPRS radio interface; Stage 2", TS 101 350, GSM 03.64 version 6.0.1 Release 1997; Aug. 1998, pp. 1-56.

* cited by examiner

FIG.3

| k | $\alpha = \dfrac{1}{2^{k/2}}$ | $F_n = (1-\alpha)F_{n-1} + \alpha M_n$ |
|---|---|---|
| 0 | 1 | $F_n = M_n$ |
| 1 | $\dfrac{1}{\sqrt{2}}$ | $F_n = \left(1 - \dfrac{1}{\sqrt{2}}\right)F_{n-1} + \dfrac{1}{\sqrt{2}}M_n$ |
| 2 | $\dfrac{1}{2}$ | $F_n = \dfrac{1}{2}F_{n-1} + \dfrac{1}{2}M_n$ |
| 4 | $\dfrac{1}{4}$ | $F_n = \dfrac{3}{4}F_{n-1} + \dfrac{1}{4}M_n$ |
| 6 | $\dfrac{1}{8}$ | $F_n = \dfrac{7}{8}F_{n-1} + \dfrac{1}{8}M_n$ |
| ⋮ | ⋮ | ⋮ |

FIG.5

| CONDITIONS | | PARAMETER | EXAMPLE 1 | EXAMPLE 2 | EXAMPLE 3 | EXAMPLE 4 |
|---|---|---|---|---|---|---|
| P-CH | | S-intra | −8dB | −9dB | −10dB | −12dB |
| | | DRX INTERVAL | 1.5s | 2s | 2.5s | 2.5s |
| | | $T_{reselection}$ | 1s | 1s | 3s | 4s |
| | | $Q_{hyst}$ | 1dB | 2dB | 4dB | 6dB |
| AVERAGING FACTOR k | | | k=1 | k=1 | k=2 | k=3 |

FIG.6

| CONDITIONS | | PARAMETER | LOW-SPEED (NORMAL) | HIGH-SPEED (MOVING) |
|---|---|---|---|---|
| P-CH | | S-intra | −10dB | |
| | | DRX INTERVAL | 2.5s | |
| | | T_reselection | 3s | |
| | | Q_hyst | 4dB | |
| AVERAGING FACTOR k | | | k=2 | k=1 |

FIG.7

| CONDITIONS | | PARAMETER | AREA A | AREA B | AREA C |
|---|---|---|---|---|---|
| P-CH | | S-intra | N/A | -4dB | N/A |
| | DRX INTERVAL | 1.5s | 1.5s | 2s |
| | | $T_{reselection}$ | 2s | 1s | 1s |
| | | $Q_{hyst}$ | 2dB | 4dB | 0dB |
| AVERAGING FACTOR k | | | k=1 | k=1 | k=2 |

MOBILE TERMINAL AND METHOD USED IN THE SAME

BACKGROUND OF THE INVENTION

1. Field of the Invention

A certain aspect of the present invention relates to mobile communication technologies. More particularly, the present invention relates to a mobile terminal and a method used in the mobile terminal.

2. Description of the Related Art

A mobile terminal in the standby mode performs a cell search and selects a suitable cell based on the results of the cell search. Cell selection is performed regardless of whether the mobile terminal is stationary or moving. When a mobile terminal in the standby mode is stationary, substantial changes in the radio propagation conditions are not normally observed and therefore it is not normally necessary to frequently perform cell selection. Still, however, instantaneous measurements of radio propagation conditions change continuously. Therefore, if cell selection is performed based on instantaneous values of radio propagation conditions, unnecessary reselection of cells is performed frequently and as a result, efficiency of the network or the mobile terminal is reduced. In a related-art method, the mobile terminal averages measurements of radio propagation conditions to prevent such frequent reselection of cells and thereby to lengthen the standby time. In the method, the mobile terminal averages the measurements based on an averaging (filtering) factor that is a fixed value provided in the mobile terminal.

Meanwhile, Japanese Patent Application Publication No. 2007-258845 and Japanese Patent Application Publication No. 2007-202096 disclose a method for determining whether to switch the mobile terminal to an intermittent reception mode or a different frequency measurement mode based on an average of signal measurements.

A mobile terminal regularly receives broadcast information from a base station which includes parameters related to a cell measurement interval and cell reselection specified by the network. Such parameters may change according to the conditions of cells. If the conditions of cells change, the timing and frequency at which cell reselection is required may also change and therefore it is preferable to change the method of averaging measurements of, for example, the signal reception level. Particularly, when the mobile terminal is moving, suitable cells change constantly and therefore it is preferable to frequently calculate or update the average of reception level measurements.

However, in the related art, the averaging factor provided in the mobile terminal is fixed (constant) and the same averaging method is used regardless of the cell conditions. Accordingly, with the related-art technologies, it is difficult to appropriately average measurements of communication quality of neighboring cells according to actual cell conditions and thereby to select a suitable cell.

To summarize, related-art technologies have disadvantages as described below.

(a) The averaging factor used to average measurements of cell quality for cell selection is not changed even when parameters related to a measurement interval and cell selection specified by the network are changed. Therefore, it is difficult to average the measurements according to actual or current conditions of cells.

(b) Although communication conditions are much influenced by the moving speed of the mobile terminal, the averaging factor used in averaging measurements of cell quality is not changed even when the moving speed changes. Therefore, it is difficult to average the measurements according to the communication conditions.

SUMMARY OF THE INVENTION

Aspects of the present invention provide a mobile terminal and a method used in the mobile terminal that solve or reduce one or more problems caused by the limitations and disadvantages of the related art.

An aspect of the present invention provides a mobile terminal used in a cellular mobile communication system. The mobile terminal includes a measuring unit configured to measure reception levels of received signals; an averaging unit configured to average the measured reception levels based on a forgetting factor; a cell reselection unit configured to reselect a cell based on the averaged reception level; and a factor determining unit configured to determine the forgetting factor according to parameters sent from a network.

BRIEF DESCRIPTION OF THE DRAWINGS

FIG. 3 is a table showing relationships between an averaging (filtering) factor k, a forgetting factor $\alpha$, and an average Fn;

FIG. 5 is a table showing exemplary parameter settings (1);

FIG. 6 is a table showing exemplary parameter settings (2);

FIG. 7 is a table showing exemplary parameter settings (3); and

DESCRIPTION OF THE PREFERRED EMBODIMENTS

Preferred embodiments of the present invention are described below with reference to the accompanying drawings.

According to an embodiment of the present invention, a forgetting factor $\alpha$ used in averaging measurements of a neighboring cell is determined according to parameters including an intermittent reception interval, a cell reselection wait period, and/or a cell reselection threshold specified by the network. For example, measurements of cell quality such as the reception level may be averaged by the following formula:

$$Fn = (1-\alpha) \times F_{n-1} + \alpha \times Mn$$

In the above formula, Fn indicates an updated average, $F_{n-1}$ indicates a previous average (an average before being updated), and Mn indicates a most recent measurement (instantaneous value). The forgetting factor $\alpha$ may be obtained by the following formula:

$$\alpha = 2^{(-k/2)}$$

In this formula, k indicates an averaging (filtering) factor and is greater than or equal to 0. Accordingly, the forgetting factor $\alpha$ becomes a value less than or equal to 1.

In averaging measurements, this approach makes it possible to change the weight of the previous average $F_{n-1}$ with respect to the most recent measurement Mn by changing the averaging factor k and thereby changing the forgetting factor α.

According to another embodiment of the present invention, cell reselection is performed if the reception level of signals from a neighboring cell becomes higher than the reception level of signals from a serving cell and the difference between the reception levels continues to be greater than or equal to a cell reselection threshold (hysteresis level) for a cell reselection wait period or longer. In this case, the parameters described above may include a cell reselection wait period $T_{reselection}$. The length of the cell reselection wait period affects the probability that cell reselection will be performed. Therefore, it is preferable to determine the weight of the previous average $F_{n-1}$ with respect to the most recent measurement Mn taking into account the length of the cell reselection wait period. Alternatively, the parameters described above may include a hysteresis level $Q_{hyst}$ because the hysteresis level also affects the probability that cell reselection will be performed.

According to another embodiment of the present invention, the forgetting factor α is determined according to the moving speed of the mobile terminal. The moving speed affects the frequency at which the channel conditions change. Therefore, it is preferable to determine the forgetting factor α, i.e., the weight of the previous average $F_{n-1}$ with respect to the most recent measurement Mn, according to the moving speed.

Figure 1:
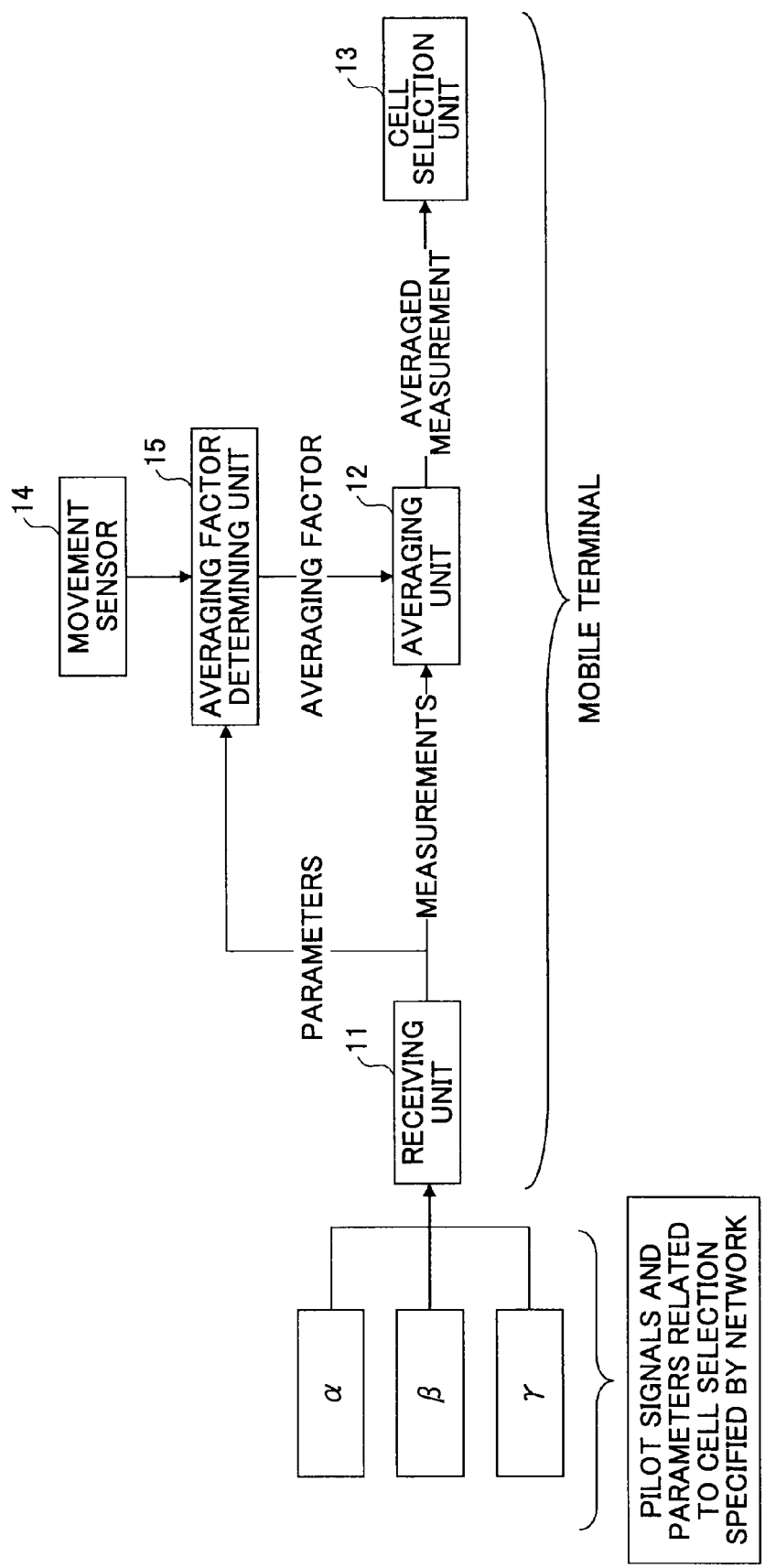
FIG. 1 is a schematic block diagram illustrating a mobile terminal according to an embodiment of the present invention.

FIG. 1 is a schematic block diagram illustrating a mobile terminal according to an embodiment of the present invention. The mobile terminal may be implemented as any user device such as a cell phone or a personal computer. As shown in FIG. 1, the mobile terminal includes a receiving unit 11, an averaging unit 12, a cell selection unit 13, a movement sensor 14, and an averaging factor determining unit 15.

The receiving unit 11 receives radio signals from a base station, and demodulates and decodes the received radio signals. In this embodiment, pilot signals and broadcast information in the radio signals are particularly relevant. Broadcast information includes various information and parameters specified by the network. For example, broadcast information includes parameters such as a cell search threshold (S-intra), an intermittent reception interval ($T_{DRX}$), a cell reselection wait period ($T_{reselection}$) and a hysteresis level ($Q_{hyst}$) used as a cell reselection threshold. In FIG. 1, pilot signals and those parameters are represented by α, β, and γ. The receiving unit 11 also measures instantaneous reception levels of pilot signals from a serving cell and/or a neighboring cell. In this embodiment, a "reception level" indicates instantaneous or average quality of radio conditions. The reception level may be represented, for example, by a received power, a received signal strength indicator (RSSI), a received signal code power (RSCP), a path loss, a signal-to-noise (S/N) ratio, or an energy-per-chip-to-noise ratio ($Ec/N_0$).

Figure 2:
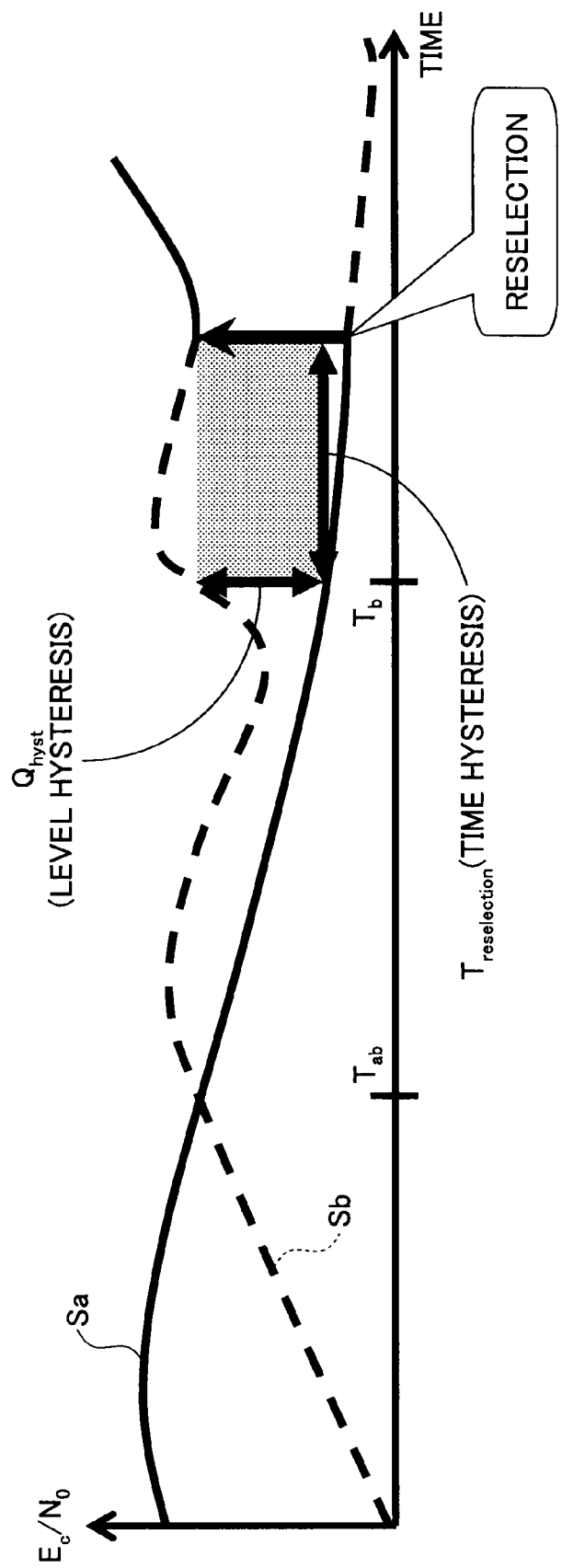
FIG. 2 is a graph used to describe parameters to be broadcast.

FIG. 2 is a graph used to describe parameters related to cell selection. In the graph, it is assumed that the mobile terminal is in the standby mode and regularly receiving a control signal at an intermittent reception interval ($T_{DRX}$) of, for example, 2.5 s. The control signal, in this case, generally refers to a paging indicator channel (PICH). The mobile terminal performs a neighboring cell search when the reception level of a signal of the serving cell becomes less than or equal to the cell search threshold (S-intra). In FIG. 2, "Sa" indicates an average of reception levels of signals received from the base station of the serving cell and is calculated using a fixed forgetting factor as in the related art. "Sb" indicates an average of reception levels of signals received from the base station of a neighboring cell (that is likely to be selected) and is calculated using a fixed forgetting factor as in the related art. In this example, the reception levels are represented by $Ec/N_0$. However, reception levels may be represented by any other appropriate indicator. When the mobile terminal comes close to the cell edge at time $T_{ab}$, the order of the reception levels (averages) Sa and Sb changes (Sb becomes greater than Sa). If the cells are switched (reselected) immediately when the order of the reception levels Sa and Sb changes, the problem (unnecessary, frequent reselection of cells) as described above may occur. For this reason, cell reselection is performed if the reception level Sb of signals from the neighboring cell becomes higher than the reception level Sa of signals from the serving cell and the difference between the reception levels continues to be greater than or equal to the hysteresis level $Q_{hyst}$ for the cell reselection wait period $T_{reselection}$ or longer. In this example, cell reselection is performed after the cell reselection wait period $T_{reselection}$ from time $T_b$.

The averaging unit 12 averages measured reception levels of the serving cell and/or the neighboring cell. For example, the averaging unit 12 averages the measured reception levels using a forgetting factor α (<1). When $F_{n-1}$ indicates a previous average and Mn indicates a most recent measurement (instantaneous value), an updated average Fn is, for example, represented by the following formula:

$$Fn = (1-\alpha) \times F_{n-1} + \alpha \times Mn \quad (A)$$

As described later, unlike in the related art, the forgetting factor α in this embodiment is variable.

The cell selection unit 13 determines whether it is necessary to switch cells based on the averaged measurement and performs cell reselection if necessary.

The movement sensor 14 measures the mobility (or moving speed) of the mobile terminal. For example, the movement sensor 14 determines the mobility by measuring the maximum Doppler frequency $f_D$.

The averaging factor determining unit 15 adjusts the forgetting factor α according to communication conditions. The communication conditions may be determined, for example, based on parameters in broadcast information and/or the mobility measured by the movement sensor 14. As described above, in this embodiment, measurements are averaged using the formula (A) described above. Although the forgetting factor is fixed in the related art, the forgetting factor α in this embodiment is variable. The forgetting factor α in this embodiment is defined by the following formula:

$$\alpha = 2^{(-k/2)} \quad (B)$$

In the formula (B), k indicates an averaging (filtering) factor and is greater than or equal to 0.

FIG. 3 is a table showing relationships between the filtering factor k, the forgetting factor α, and the average Fn. As shown in FIG. 3, when k=0, the previous average $F_{n-1}$ is not taken into account and Fn equals the instantaneous value Mn. As the value of k increases, the influence of the previous average $F_{n-1}$ on the updated average Fn increases. In other words, the smaller the value of k is, the greater the weight of the instantaneous value Mn becomes; and as the value of k increases, the average Fn changes more slowly. The forgetting factor α may be represented by any other formula than the formula (B) and the averaging factor k may take any values as long as the average Fn shows a tendency as shown in FIG. 3.

Figure 4:
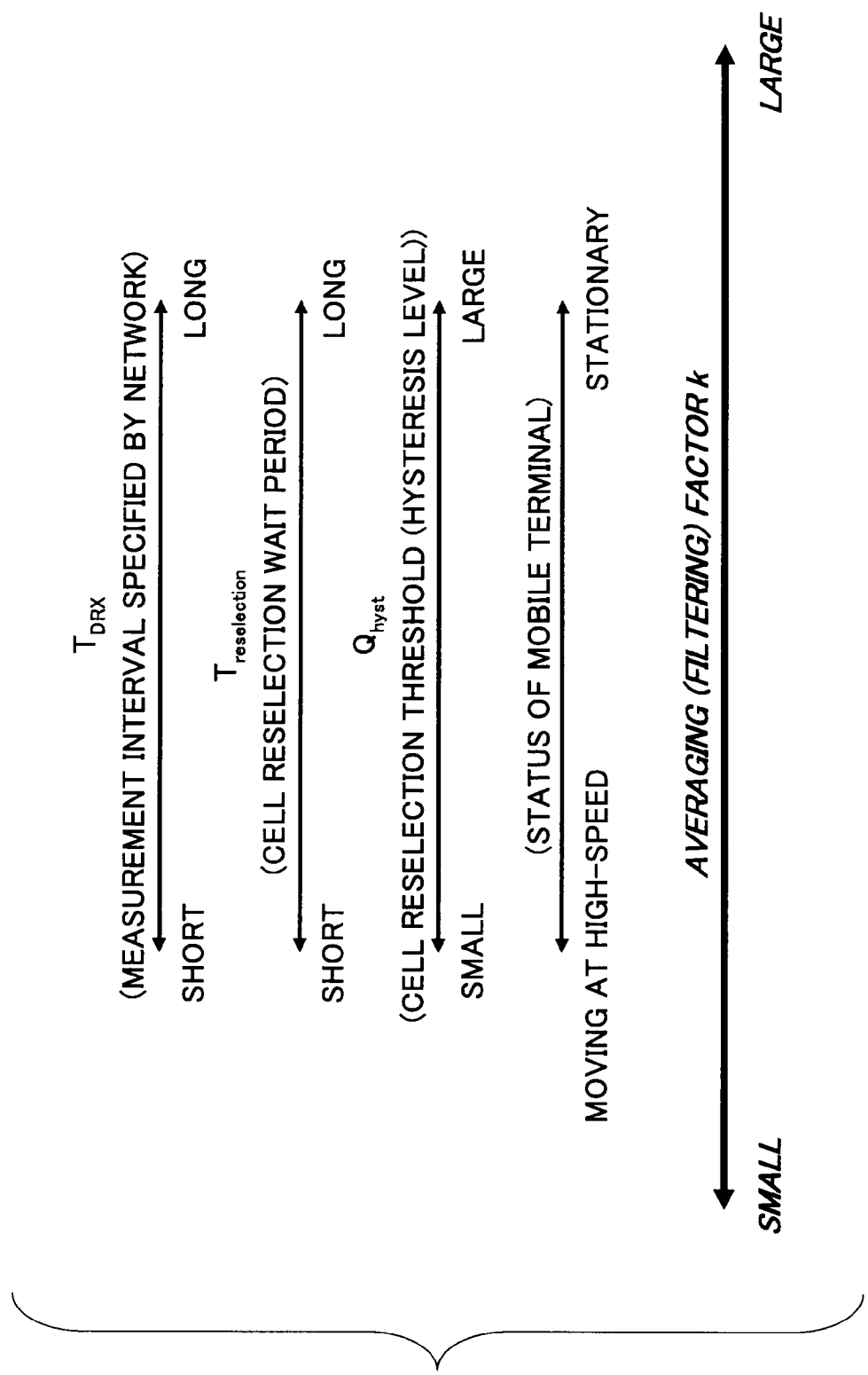
FIG. 4 is a drawing illustrating qualitative relationships between an averaging factor k and various parameters.

FIG. 4 is a drawing illustrating qualitative relationships between the averaging factor k and various parameters.

When the intermittent reception interval $T_{DRX}$ is long, the reception level is measured less frequently. In this case, an average value is more important than an instantaneous value.

Therefore, the averaging factor k is set at a large value so that the average Fn changes slowly. On the contrary, when the intermittent reception interval $T_{DRX}$ is short, the reception level is measured frequently. In this case, the averaging factor k is set at a small value to increase the weight of the instantaneous value Mn and thereby to make the average Fn to exactly reflect the current communication conditions.

When the cell reselection wait period $T_{reselection}$ is long, i.e., cell reselection is performed after a long period from time Tb in FIG. 2, an average value is more important than an instantaneous value. Therefore, the averaging factor k is set at a large value so that the average Fn changes slowly. On the other hand, when the cell reselection wait period $T_{reselection}$ is short, i.e., reselection is performed after a short period from time Tb in FIG. 2, an instantaneous value is more important than an average value. In this case, the averaging factor k is set at a small value to increase the weight of the instantaneous value Mn and thereby to quickly change the average Fn to exactly reflect the current communication conditions.

When the hysteresis level $Q_{hyst}$ is large, the probability of cell reselection is low. In this case, an average value is more important than an instantaneous value. Therefore, the averaging factor k is set at a large value so that the average Fn changes slowly. On the other hand, when the hysteresis level $Q_{hyst}$ is small, the probability of cell reselection is high. In this case, the averaging factor k is set at a small value to increase the weight of the instantaneous value Mn and thereby to quickly change the average Fn to exactly reflect the current communication conditions.

When the mobility $f_D$ is low, the channel conditions do not change frequently. In this case, an average value is more important than an instantaneous value. Therefore, the averaging factor k is set at a large value so that the average Fn changes slowly. On the other hand, when the mobility $f_D$ is high, the channel conditions change frequently. In this case, the averaging factor k is set at a small value to increase the weight of the instantaneous value Mn and thereby to change the average Fn to exactly reflect the frequently-changing current communication conditions.

The parameters and their characteristics described above are just examples. The averaging factor k may be adjusted based on the value of any other parameter in a manner as described above. The same weight may be given to the above parameters or greater weight may be given to a given one of the parameters. For example, greater weight may be given to the intermittent reception interval $T_{DRX}$ and the mobility $f_D$. When, for example, the intermittent reception interval $T_{DRX}$ is long, it is normally not necessary to increase the weight of the instantaneous value Mn so that the average Fn is quickly changed to reflect the current communication conditions. On the other hand, even if the hysteresis level $Q_{hyst}$ is large, it may be necessary to quickly change the average Fn to reflect the current communication conditions.

FIG. 5 is a table showing exemplary parameter settings (1). In FIG. 5, the averaging factor k is set at 1 in examples 1 and 2, set at 2 in example 3, and set at 3 in example 4. The averaging factor k in example 3 is larger than that in examples 1 and 2 because the intermittent reception interval $T_{DRX}$ and the cell reselection wait period $T_{reselection}$ are longer and the hysteresis level $Q_{hyst}$ is larger. The averaging factor k in example 4 is still larger than that in example 3 because the cell reselection wait period $T_{reselection}$ is longer and the hysteresis level $Q_{hyst}$ is larger.

FIG. 6 is a table showing exemplary parameter settings (2). In this example, different values are set for the averaging factor k depending on the mobility. For example, a user moving at a speed of 60 km/h or higher is classified as a high-speed user and a user moving at a lower speed is classified as a low-speed user.

FIG. 7 is a table showing exemplary parameter settings (3). In this example, different values are set for the averaging factor k for areas A, B, and C where different telecommunication carriers provide services. The values of the parameters differ depending on the telecommunication carriers and the averaging factor k is set according to the parameter values.

The parameter settings as shown in FIGS. 5, 6, and 7 may be stored in the mobile terminal as a table. Alternatively, the averaging factor k may be determined without using a table as described above with reference to FIG. 4.

Figure 8:
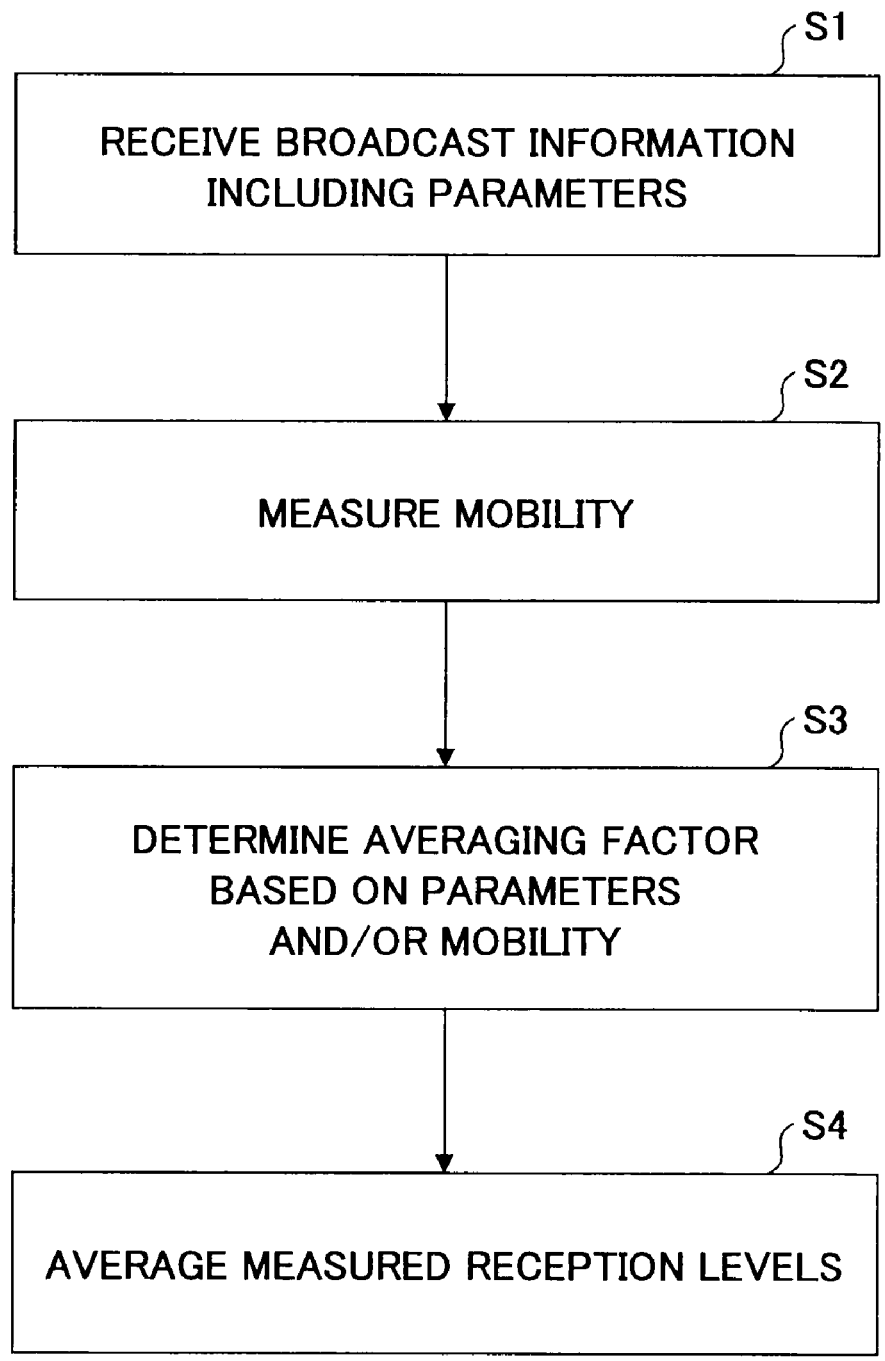
FIG. 8 is a flowchart showing an exemplary process performed by a mobile terminal.

FIG. 8 is a flowchart showing an exemplary process performed by the mobile terminal of FIG. 1. In step S1, the mobile terminal receives broadcast information including parameters. For example, the broadcast information includes parameters such as a cell search threshold (S-intra), an intermittent reception interval ($T_{DRX}$), a cell reselection wait period ($T_{reselection}$), and a hysteresis level ($Q_{hyst}$).

In step S2, the mobile terminal measures the mobility. The mobility is, for example, determined by measuring the maximum Doppler frequency $f_D$.

In step S3, the mobile terminal determines an averaging factor k based on the received parameters and/or the mobility. The averaging factor k may be determined as described above with reference to FIG. 4.

In step S4, the mobile terminal calculates a forgetting factor based on the determined averaging factor k and averages measured reception levels based on the forgetting factor. Then, the mobile terminal reselects a cell as needed.

In the above exemplary process, step S2 is performed after step S1. However, steps S1 and S2 may be performed in any order or may be performed simultaneously. Also, step S2 is not essential and may be omitted. In other words, the averaging factor k may be determined solely on one or more of the parameters in the broadcast information.

As described above, an embodiment of the present invention makes it possible to appropriately change the averaging factor, which is fixed in the related art technologies, according to parameters related to a measurement interval and cell selection specified by the network and/or the moving speed of a mobile terminal. This in turn makes it possible to appropriately average measurements of neighboring cell quality, to more appropriately reselect a cell, and thereby to improve the call connection quality and to reduce the power consumption.

Thus, embodiments of the present invention make it possible for a mobile terminal to average measurements of neighboring cell quality according to communication conditions in a corresponding area.

The present invention may be applied to any type of cellular mobile communication system. For example, the present invention may be applied to an IMT-2000 system, an HSDPA/HSUPA W-CDMA system, an LTE system, an IMT-Advanced system, a WiMAX system, and a Wi-Fi system.

The present invention is not limited to the specifically disclosed embodiments, and variations and modifications may be made without departing from the scope of the present invention. Although specific values are used in the above descriptions to facilitate the understanding of the present invention, the values are just examples and different values may also be used unless otherwise mentioned. The distinctions between the embodiments are not essential for the present invention, and the embodiments may be used individually or in combination. Although a functional block diagram is used to describe an apparatus in the above embodiments, the apparatus may be implemented by hardware, software, or a combination of them.

The present application is based on Japanese Priority Application No. 2008-134601, filed on May 22, 2008, the entire contents of which are hereby incorporated herein by reference.

What is claimed is:

1. A mobile terminal used in a cellular mobile communication system, comprising:
   a measuring unit configured to measure reception levels of received signals;
   an averaging unit configured to average the measured reception levels based on a forgetting factor;
   a cell reselection unit configured to reselect a cell based on the averaged reception level; and
   a factor determining unit configured to determine the forgetting factor according to parameters sent from a network,
   wherein the parameters include an intermittent reception interval, a cell reselection wait period, and a cell reselection threshold,
   cell reselection is performed if a reception level of a signal from a neighboring cell becomes higher than a reception level of a signal from a serving cell and a difference between the reception levels continues to be greater than or equal to the cell reselection threshold for the cell reselection wait period or longer, and
   the factor determining unit is configured to determine the forgetting factor according to a formula $\alpha=2^{-k/2}$ where $\alpha$ indicates the forgetting factor and k indicates an averaging factor that is greater than or equal to zero, the averaging factor being changed according to variation of one or more of the intermittent reception interval, the cell reselection wait period, the cell reselection period, and a mobility of the mobile terminal.

2. The mobile terminal as claimed in claim 1, wherein the factor determining unit is further configured to determine the forgetting factor according to a moving speed of the mobile terminal in addition to the parameters.

3. A method used in a mobile terminal to measure neighboring cell quality in a cellular mobile communication system, comprising:
   receiving parameters including an intermittent reception interval, a cell reselection wait period, and a cell reselection threshold from a base station; and
   determining a forgetting factor used in averaging measurements of the neighboring cell quality according to the received parameters,
   wherein cell reselection is performed if a reception level of a signal from a neighboring cell becomes higher than a reception level of a signal from a serving cell and a difference between the reception levels continues to be greater than or equal to the cell reselection threshold for the cell reselection wait period or longer, and
   the forgetting factor is determined according to a formula $\alpha=2^{-k/2}$ where $\alpha$ indicates the forgetting factor and k indicates an averaging factor that is greater than or equal to zero, the averaging factor being changed according to variation of one or more of the intermittent reception interval, the cell reselection wait period, the cell reselection period, and a mobility of the mobile terminal.

4. The method as claimed in claim 3, wherein the forgetting factor is determined according to a moving speed of the mobile terminal in addition to the parameters.

* * * * *